April 15, 1969 W. DAVIS 3,438,667
VERTICAL BUMPER GUARD
Filed Oct. 23, 1967
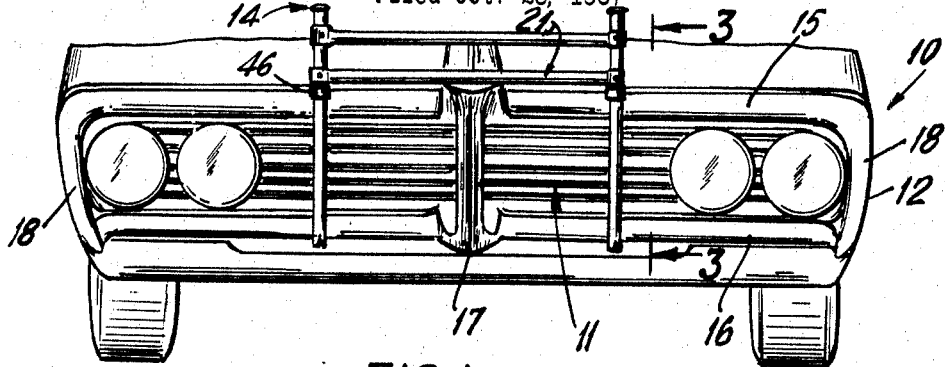
FIG. 1
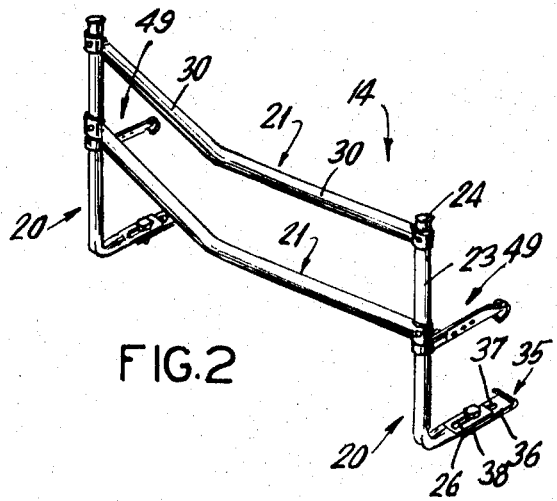
FIG. 2
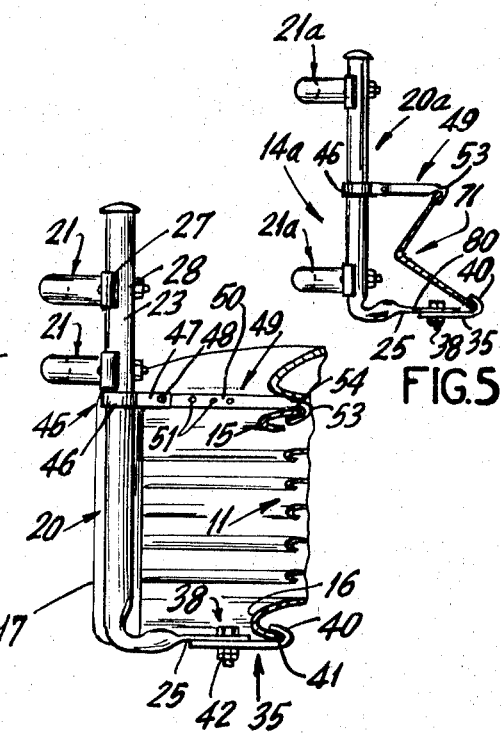
FIG. 5
FIG. 3
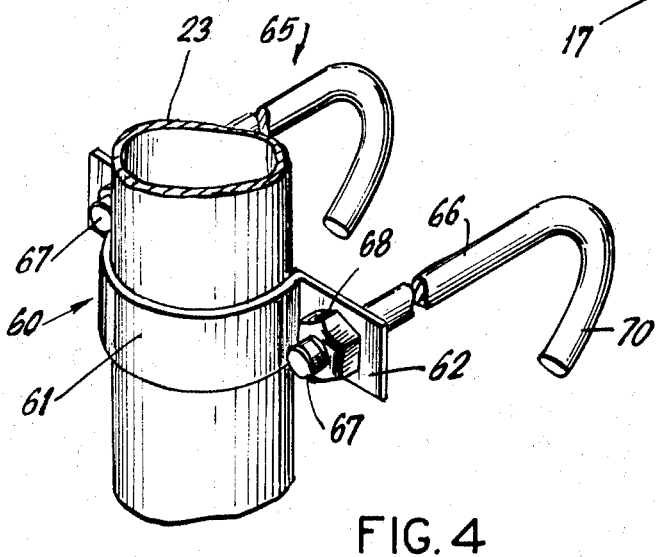
FIG. 4
INVENTOR.
WALTER DAVIS
BY
J.B. Felshin
ATTORNEY United States Patent Office 3,438,667
Patented Apr. 15, 1969

3,438,667
VERTICAL BUMPER GUARD
Walter Davis, 99—05 63rd Drive,
Rego Park, N.Y. 11374
Filed Oct. 23, 1967, Ser. No. 677,150
Int. Cl. B60r 19/04, 21/14; B61f 19/04
U.S. Cl. 293—64   12 Claims

ABSTRACT OF THE DISCLOSURE

The grill and bumper guard comprises a pair of side members interconnected by a pair of horizontal transverse members. The side members each comprises a vertical portion from the lower end of which a horizontal foot extends rearwardly. Attached to the vertical portions and to the horizontal feet of the side members, are adjustable hooked members extending rearwardly to engage upper and lower edges respectively of a grill bumper or any other bumper. The transverse members extend forwardly from the ends thereof and are bolted at their outer ends to the vertical portions of the side members. The hooked members which are attached to the vertical portions of the side members can be adjusted in height and in length.

BACKGROUND OF THE INVENTION

Field of the invention

The grill and bumper guard embodying the invention is particularly adapted for present day bumpers which are flush against a grill panel or against a rear end panel of the vehicle. With such construction you cannot get behind the bumper for attachment of a bumper or grill guard thereto.

Description of the prior art

In the prior art there are bumper and grill guards which are for use with bumpers which are spaced forwardly of the grill or of the body of the automobile. Said prior devices are constructed for attachment to a bumper by means of devices which are disposed between the bumper and the grill or body of the automobile.

SUMMARY OF THE INVENTION

An object of the present invention is to provide a grill and bumper guard of the character described which is easy to install without drilling, which is good looking and will fit all sizes of grill guards or bumpers and which will amply protect the grill and its bumper, which are expensive, having reference particularly to present day grill bumpers or rear panel bumpers which are flush against the grill or rear panel and leave no space between the bumper and the grill or rear panel.

Another object of this invention is to provide a guard of the character described, which comprises front transverse members that extend forwardly so as to get around the nose of a grill or bumper that have central projections.

Another object of this invention is to provide a guard of the character described, which may be used to protect either front or rear bumpers and which in itself comprises a safety guard or bumper for the automobile and which can be used efficiently for parking to protect the grill and rear end panel against bumps during parking.

Still another object of this invention is to provide a device which uses only bolts and nuts throughout for mounting on an automobile.

Present day bumpers are flush against the grill panel and the rear end panel and you cannot get behind these panels for attaching a grill or bumper guard thereto, but there is plenty of room in front of the grill guard or rearwardly of the rear panel guard. In accordance with the present invention the guard may be attached without necessity for getting behind the grill or bumper guard for attachment, as it requires only to hook onto the upper and lower edges of the grill bumper or any other bumper for attachment thereto.

Furthermore, the device embodying the present invention may be adjusted, may be engaged with the upper and lower edges of a bumper and will fit different shapes of bumpers and bumpers which extend to different angles or are of different heights.

The most modern types of grill bumpers comprise a top portion at the upper edge of the grill and a bottom portion at the lower end of the grill, and the device embodying the invention comprises means for hooking to the upper edge of the upper bumper portion and the lower edge of the lower bumper portion.

Yet another object of this invention is to provide a grill or rear panel bumper guard of the character described, which is strong, rugged and durable, which shall be easy to manipulate and adjust, which shall be easy to mount on various types of bumpers, which shall be relatively inexpensive to manufacture and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of invention will be indicated in the following claims.

BRIEF DESCRIPTION OF THE DRAWING

In the accompanying drawing, in which are shown various illustrative embodiments of this invention, FIG. 1 is a front elevational view of an automobile and showing the grill and bumper guard embodying the invention mounted thereon;

FIG. 2 is a perspective view of the grill and bumper guard embodying the invention;

FIG. 3 is a cross-sectional view taken on line 3—3 of FIG. 1;

FIG. 4 is a perspective view illustrating a modified form of a detail; and

FIG. 5 is a view similar to FIG. 3 illustrating a modified construction of grill and bumper guard and showing the same attached to another type of bumper.

DESCRIPTION OF THE PREFERRED EMBODIMENTS

Referring now in detail to the drawing, 10 designates a vehicle such as an automobile, provided with a grill 11 and a grill bumper 12 on which is mounted a grill and bumper guard 14 embodying the invention. While the grill and bumper guard 14 may be mounted on any type of bumper, it is shown in FIG. 1 to be mounted on the bumper 12 used in some of the latest models of automobiles in which the bumper 12 comprises an upper portion 15 and a lower portion 16 interconnected by a vertical middle nose portion 17 and by end portions 18. The middle portion 17 protrudes forwardly from the portions 15 and 16.

The grill and bumper guard 14 embodying the invention comprises a pair of similar side members 20 interconnected by a pair of transverse horizontal members 21. Each of the side members 20 comprises a vertical tubular portion 23, the upper end of which may be capped by any suitable cap 24. Extending rearwardly from the lower end of the vertical portion 23 is a foot 25 which may be made by flattening the tubular stock of which member 20 is constructed. The foot 25 may be formed with a longitudinal slot 26 for the purpose hereinafter appearing.

The transverse members 21 are parallel to each other and may be similar in construction. They may also be made of tubular stock. Each of the ends of members 21 comprises an inwardly curved portion 27 formed by flattening the tubular stock and curving the flattened end portion so as to snugly fit the front of the vertical portion 23 of member 20. The curved ends 27 are at the front of the vertical portions 23. Said curved portions 27 and the tubular portions 23 are formed with registering openings to receive bolts 25 for fixing members 21 to side members 20. Members 21 each has forwardly extending portions 30 forming a V. Said portions 30 may also be forwardly curved if desired. One member 21 may be located at the upper ends of the tubular portions 23 and the second member 21 may be disposed several inches therebelow.

Means is provided for attaching the side members 20 with the transverse members 21 attached thereto, to the bumper 12 which surrounds the grill 11. To this end there is provided for each foot 25 an attaching or connecting member 35. The attaching member 35 comprises a flat strip 36 formed with a longitudinal slot 37. The slots 26 and 37 overlap and a bolt 38 is passed therethrough for attaching member 35 to the foot 25. Member 35 has an upwardly and forwardly bent-back hook 40 at its rear end to engage a rear extending end edge 41 of the lower bumper portion 16. It will be noted that the member 35 may be adjusted longitudinally as well as angularly with respect to the foot 25. The bolt 38 preferably has lock nuts 42 at its lower end to firmly attach the member 35 to the foot.

Mounted on the tubular portion 23 of each side member 20 is a strap member 45. Strap member 45 comprises a portion 46 encircling tubular portion 23 and from which a pair of parallel spaced strap ends or apertured ears 47 extend. The strap ends or ears 47 are formed with aligned openings to receive a bolt 48 for attaching a connector member 49 to the strap. The connector member 49 comprises a flat portion 50 disposed in a vertical plane and formed with a plurality of spaced openings 51. One of the openings will register with the openings in the strap ends 47 so that the bolt 48 may pass therethrough. Flat portion 50 may be cut to desired length. At the rear end of portion 50 of the connector member 49 is a hook 53 twisted 90° with respect to said flat portion 50, for engaging a rearwardly extending end edge 54 on the upper bumper portion 15. The strap members 45 may be slid up and down on tubular portions 23, for adjustment and hence the grill and bumper guard 14 may be attached to bumpers of various heights. It will also be noted that connector members 49 may be adjusted angularly with respect to the strap members 50. The feet 25 instead of being provided with slots 26 may, if desired, be provided with individual openings also. Individual openings may replace the slot 37 of members 35. It will be noted that the forwardly projecting portions 30 of members 21 provide space for the forwardly projecting portion nose 17 of the bumper 12.

In FIG. 4 there is shown a modified form of strap and connector for the upper bumper. As shown in FIG. 4 straps 45 are replaced by straps 60 which have portions 61 partly surrounding the tubular portion 23 and coplanar outwardly extending apertured ears 62. Each connector 49 is replaced by a pair of connectors 65 having straight rod portions 66 formed with forward threaded portions 67 which extend through openings in the ears 62. Nuts 68 are screwed to the threaded end 67. At the rear ends of the rods 66 are downwardly and forwardly inclined bent-back hooks 70 to engage the upper end edge bumper portion 15.

In FIG. 5 there is shown a modified form of a grill and bumper guard 14a embodying the invention. The bumper guard 14a comprises side members 20a similar to the side members 20 and interconnected by transverse members 21a. In FIG. 5 however, one member 21a may be disposed at the upper ends of the side members 20a, but the other member 21a may be down near the lower ends of said side members. Connector members 49 may be connected to straps 45 the same as in FIGS. 1–3. Also bottom connector members 35 may be attached to feet 25 at the lower ends of the side members. In FIG. 5 however, the device 14a is shown attached to a bumper 71 which has a forwardly projecting mid-portion. The space between the hooks 53, 40 and the vertical portions of the side members 20a accommodate the forwardly projecting mid-portion of the bumper 71. As is the case with the construction of FIGS. 1–3, the slots in the feet 25 may be replaced by spaced openings 80 and members 35 may either be formed with slots or openings as desired, to register with the openings 80 and receiving the bolts 38.

The bumper 12 is flush against the grill panel of a car and also against the rear end panels. The grill and bumper guards 14 and 14a may be attached either to the grill bumpers or to the rear panel bumpers. The device embodying the invention is easy to install. No drilling is necessary in any part of the automobile. They are attractive in appearance. They may be made in various heights and widths and will amply protect the grill and its bumper against injury. The V shapes of the transverse members 21 which project forward gets around the nose of the grill and around bumpers that have forwardly projecting portions. The device may be used for either front or rear bumpers. It is a safeguard bumper in itself. It may very efficiently be used for parking to protect the grill and rear end panel against bumps during parking. The device embodying the invention uses bolts and nuts throughout and it is installed from the front and does not have to get behind the grill bumper to which it is being attached as it requires only to hook onto the upper and lower edges of the grill bumper or any other bumper for attachment thereto.

The device may be used for bumpers of different shapes, of different heights and of different angles. In other words, the upper hooks 53 do not have to be positioned directly above the lower hooks 40. They may be located rearwardly or forwardly of the hooks 40.

It will thus be seen that there is provided an article in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawings, is to be interpreted as illustrative and not in a limiting sense.

I claim:

1. A grill and bumper guard comprising a pair of side members, each comprising a vertical portion provided at its lower end with a rearwardly extending integral foot, a pair of spaced transverse horizontal members interconnecting the vertical portions of the side members, a first connector member connected to each foot and formed with a hook at its rear end, a strap mounted on the vertical portion of each of the side members, and a second connector member connected to each strap for angular adjustment about a horizontal axis, and having a hook at its rear end.

2. The combination of claim 1, each strap comprising a split ring having a portion encircling said vertical portion, and parallel vertical apertured ears extending from said encircling portion, and disposed in vertical planes, each of said second connectors comprising a flat portion disposed in a vertical plane and formed with spaced openings, the front end of said flat portion being received between said ears, a bolt passing through said apertured ears and through an opening in said flat portion, to provide for said angular adjustment of said second connector, said hook at said rear end of said second connector being disposed in a horizontal direction.

3. The combination of claim 1, said straps being slidable up and down on said vertical portions of said side members.

4. The combination of claim 1, each of said vertical portions being tubular, each of said transverse members having curved ends engaging said tubular vertical portions and being bolted thereto.

5. The combination of claim 1, each of the second connector members being adjustable lengthwise of said strap.

6. The combination of claim 5, and said first connector members being adjustable lengthwise on said feet and being bolted thereto.

7. The combination of claim 6, said straps being slidable up and down on said vertical portions of said side members.

8. The combination of claim 7, each of said vertical portions being tubular, each of said transverse members having curved ends engaging said tubular vertical portions and being bolted thereto.

9. The combination of claim 8, said feet comprising flattened tubular portions, said transverse members comprising tubes, and the ends thereof comprising flattened tubes.

10. The combination of claim 9, each of said transverse members having forwardly extending portions between the ends thereof.

11. The combination of claim 6, said first connector members being formed with longitudinal slots receiving bolts passing through holes in said feet, to provide for said lengthwise adjustment of said first connector members on said feet.

12. The combination of claim 11, each strap comprising a split ring having a portion encircling said vertical portion, and parallel vertical apertured ears extending from said encircling portion, and disposed in vertical planes, each of said second connectors comprising a flat portion disposed in a vertical plane and formed with spaced openings, the front end of said flat portion being received between said ears, a bolt passing through said apertured ears and through an opening in said flat portion, to provide for said angular adjustment of said second connector, said hook at said rear end of said second connector being disposed in a horizontal direction.

References Cited
UNITED STATES PATENTS

| | | | |
|---|---|---|---|
| 2,184,651 | 12/1939 | Sandberg | 293—65 |
| 2,580,775 | 1/1952 | Helms et al. | 293—64 |
| 2,650,849 | 9/1953 | Poncher et al. | 293—64 |

ARTHUR L. LA POINT, *Primary Examiner.*

HOWARD BELTRAN, *Assistant Examiner.*

U.S. Cl. X.R.

293—100